United States Patent Office 3,387,251
Patented June 4, 1968

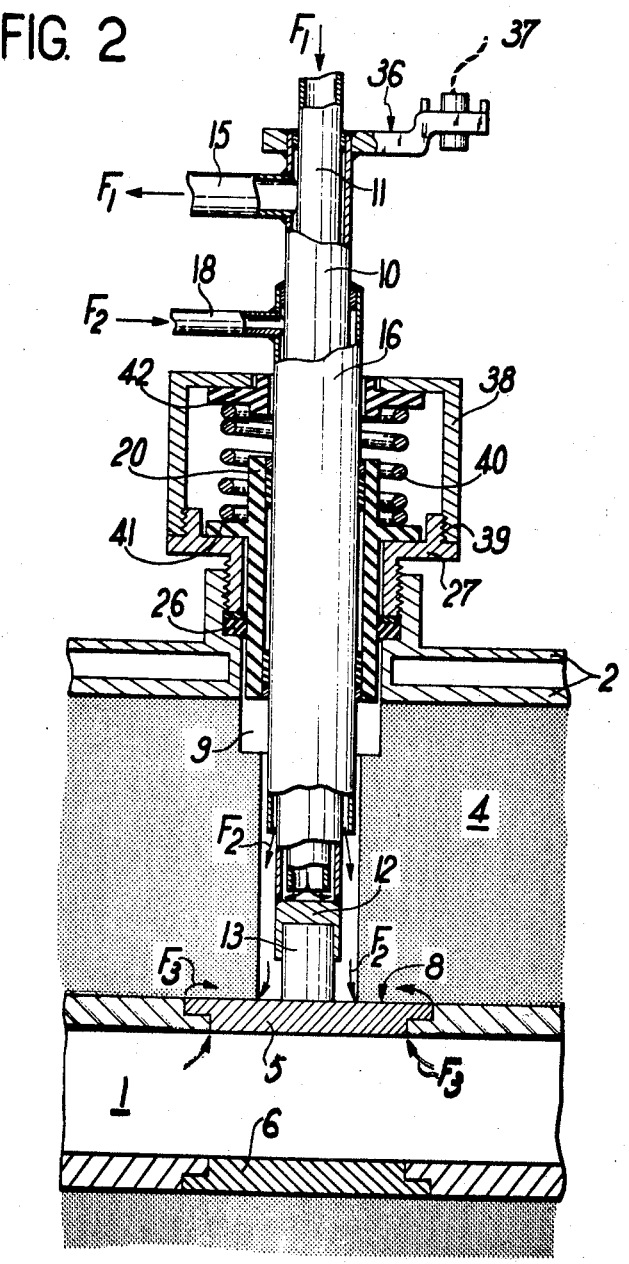

3,387,251
ELECTRICAL CONNECTION DEVICE FOR AN ELECTRODE IN CONTACT WITH A CORROSIVE FLUID
Robert Devime, Rueil-Malmaison, France, assignor to Commissariat à l'Energie Atomique, Paris, France
Filed Aug. 3, 1966, Ser. No. 569,930
Claims priority, application France, Aug. 11, 1965, 28,065
7 Claims. (Cl. 339—15)

This invention relates to a device for providing a good electrical connection between an electrode, one surface of which is in contact with a fluid which is corrosive because of its high temperature and its composition, and an electrical circuit situated outside the chamber containing said fluid.

In chambers which contain a hot corrosive fluid and which have electrodes, one of the surfaces of which is in contact with said fluid, the electrodes are generally embedded in the wall of the chamber and are of a material which is resistant both to the corrosion and erosion produced by the fluid, and has good electrical conductivity.

The second surface which is not in contact with the corrosive fluid is at the level of the outer surface of the chamber wall and is connected to external electrical circuits.

The electrical connection between this second surface of the electrodes and the outer electrical circuits consists of a conductor element, generally a graphite rod, applied to said second surface.

Such an electrical connection is difficult to make satisfactorily because of infiltration of the hot corrosive fluid from the chamber, such infiltration always occurring around the electrodes no matter what steps are taken.

This invention may be particularly advantageously applied to magnetohydrodynamic generators (MHD generators), where an electrically conductive gas at a high temperature (of the order of 3000° K.) and very corrosive (because of such temperature and the alkaline elements it contains), flows through a conversion chamber in which it is subject to the action of a magnetic field.

The present invention avoids the disadvantage of such infiltration of corrosive fluid around the electrodes and relates to a device for providing a good electrical connection between, firstly, an electrode whose first surface is in contact with a fluid which is corrosive because of its high temperature and its composition, said fluid being contained in a double-walled chamber with the second surface of said electrode facing the outer wall of the said chamber, and, secondly, an electrical circuit situated outside the said outer wall, the said device passing through an aperture formed in said outer wall and being characterised in that it comprises, firstly, a set of two coaxial metal tubes, of which the outer tube has its end which is nearest the electrode closed and rigidly secured to an element providing electrical contact with the said second surface of the electrode while its other end is connected to the said electrical circuit, and of which the inner tube leads into the outer tube near the closed end of the latter, the said two tubes providing for the flow of cooling fluid along a circuit extending through the interior of the inner tube and the annular space between the two tubes, and secondly a tubular jacket coaxial with the outer tube and rigidly secured to the latter, which it surrounds, the tubular jacket having one end open near the level of the said closure in the outer tube while its other end is fed with an inert gas flowing through the said open end of the jacket and forming a layer of inert gas surrounding the said electrical contact element, said layer of inert gas preventing that portion of said element which touches the said second surface from being attacked by the corrosive fluid.

In the preferred embodiment, the device also includes an electrically insulating bush surrounding the said tubular jacket, said bush having rings to center said tubular jacket in said bush and provide a seal between these two elements, a gasket of a material which is not an electrical conductor surrounding the said bush and provide a seal between the latter and the edges of the aperture for the passage of the device in the outer wall of the chamber, and means whereby the assembly consisting of the set of two coaxial metal tubes, the tubular jacket and the element providing electrical contact with the second surface of the electrode, is applied tightly against the second surface of the electrode.

The invention will now be described by way of example with reference to the accompanying drawings in which:

FIGURE 2 is a sectional elevation of a second embodiment of the invention.

Figure 1:
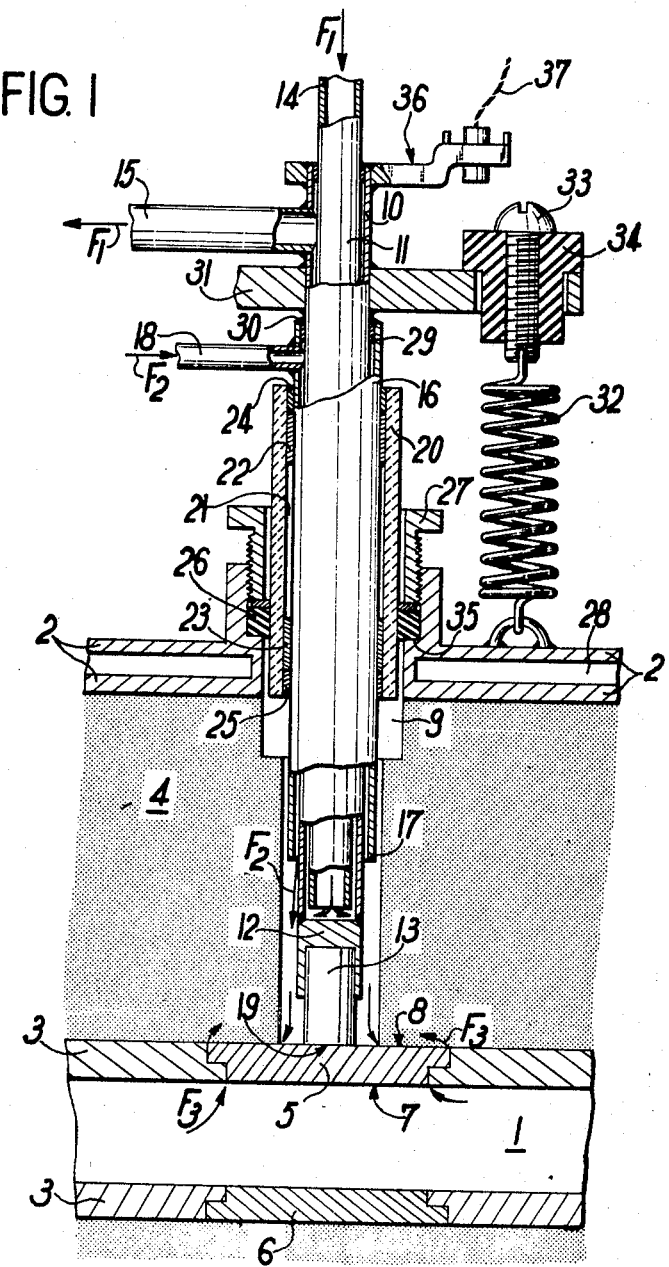
FIGURE 1 is a sectional elevation of a first embodiment of the invention.

The embodiment of the invention as illustrated in FIG. 1 comprises a device applied to a chamber 1 in which flows a hot corrosive fluid.

The chamber 1 is surrounded by a double wall which comprises the outer wall 2 and the inner wall 3. To limit the heat losses, the space 4 between these walls is filled with a heat insulating material, e.g. magnesia.

In this embodiment it will be seen that the outer wall 2 is hollow, providing an inner space 28 which is used to carry a heat vehicle fluid.

Electrodes 5 and 6 are embedded in the inner wall 3, a first or inner surface 7 of each electrode being in contact with the hot fluid flowing through the chamber 1, while the other or outer surface 8 faces the outer wall 2 of the chamber.

For clarity, the electrical connection device associated with the electrode 5 has not been shown. The aperture 9 in the outer wall 2 allows the device according to the invention to pass therethrough. The device comprises two coaxial metal tubes 10 and 11, for example of copper. The outer tube 10 is closed at 12 at one end to form a sleeve receiving an electrical contact element shown by way of example as a graphite rod 13 applied to the outer surface 8 of the electrode, thus providing electrical contact between the electrode and the outer tube 10.

The inner tube 11 extends to a position near the end 12 of the outer tube 10. Cooling fluid, e.g. water, flows through the tube 11 from the end 14 as far as closure sleeve 12 and then returns in the annular space between the tubes 10 and 11 to the discharge conduit 15 as shown by arrows $F_1$.

The device includes a tubular jacket 16 surrounding the metal tube 10 and capable of being secured thereto, for example, by a ring 29 and weld 30.

One end 17 of the jacket 16 terminates a short distance from the closure sleeve 12 of the inner tube 10. The other end of the jacket 16 has an entry conduit 18 through which an inert gas, e.g. nitrogen or argon, flows following the path indicated by arrows $F_2$ and which thus forms a sleeve of inert gas around the graphite rod 13 to prevent the contact surface 19 of this rod with the surface 8 of the electrode 5 from being attached by the very hot corrosive gases possibly infiltrating from the chamber 1 around the electrode 5 as shown by arrows $F_3$.

In the embodiment shown, the jacket 16 is itself surrounded by a spaced electrically insulating ceramic sleeve or bush 20, the gap 21 between the jacket 16 and sleeve 20 being filled, for example, with asbestos. The axial length of gap 21 is determined by centering rings 22 and 23 and closed by a sealing cement at its ends 24 and 25.

A gasket 26, for example of asbestos, provides a seal between the sleeve or bush 20 and the outer wall 2 at the aperture 9 and is compressed between a shoulder 35 formed on wall 2 at said aperture by a nut 27 threadably mounted on the wall.

The device is slidable within gasket 26 and a flange 31, surrounding the outer tube 10 and rigidly secured thereto, enables the device to be applied tightly against the surface 8 of the electrode 5 by means of a tension spring 32, one end of which is secured to the outer wall 2 of the chamber while the other end is secured to a part 33 bearing on the flange 31 and insulated therefrom by a ceramic ring 34.

The device also has means 36 for providing an electrical connection between the outer metal tube 10 and the electrical circuit 37 outside the chamber 1.

The electrical current can thus flow through the following successive elements in either direction: electrode 5, contact element 13, outer metal tube 10, connection 36 and electrical circuit 37.

Since the outer tube 10 is cooled by the fluid flow entering at 14, the connection 36 which is readily made between two metal conductors remains excellent after long periods of operation.

The contact 19 between the surface 8 of the electrode 5 and the end of the graphite rod 13 is not exposed to the corrosive action of any gases infiltrating from chamber 1 because it is protected by a layer of inert gas.

The embodiment of the invention as illustrated in FIG. 2 differs from the previous embodiment only in respect of the means used to apply the device against the surface 8 of the electrode 5.

The flange 31 and the spring 32 are replaced respectively by a casing 38 screwed onto an extension of the screwthreaded nut 27 at 39, and by a spring 40 which, when the casing 38 is screwed onto the screwthread 39, is compressed between the casing 38 and the collar 41 of the electrical insulating bush 20.

The bush 20 is therefore pushed towards the electrode 5 and slides inside the gasket 26 and drives the unit consisting of the tubular jacket 16 and the outer and inner metal tubes, so that the collar 41 comes into contact with the nut 27. The contact element 13 is thus applied to the surface 8 of the elctrode 5. The ring 42 provides insulation between the tubular jacket 16 and the casing 38 and is made for example, of steatite.

I claim:

1. A device for providing a good electrical connection between, firstly, an electrode whose first surface is in contact with a fluid which is corrosive because of its high temperature and its composition, said fluid being contained in a double-walled chamber with the second surface of said electrode facing the outer wall of the said chamber, and, secondly, an electrical circuit situated outside the said outer wall, the said device passing through an aperture formed in said outer wall and being characterised in that it comprises, firstly, a set of two coaxial metal tubes, of which the outer tube has its end which is nearest the electrode closed and rigidly secured to an element providing electrical contact with the said second surface of the electrode while its other end is connected to the said electrical circuit, and of which the inner tube leads into th outer tube near the closed end of the latter, the said two tubes providing for the flow of cooling fluid along a circuit extending through the interior of the inner tube and the annular space between the two tubes, and secondly a tubular jacket coaxial with the outer tube and rigidly secured to the latter, which it surrounds, the said tubular jacket having one end open near the level of the said closure in the outer tube while its other end is fed with an inert gas flowing through the said open end of the jacket and forming a layer of inert gas surrounding the said electrical contact element, said layer of inert gas preventing that portion of said element which touches the said second surface from being attacked by the corrosive fluid.

2. A device according to claim 1, characterised by an electrical insulation bush surrounding the said tubular jacket, said bush having rings to provide centering of said tubular jacket in said bush and a seal therebetween, a gasket of an electrically non-conductive material surrounding the said bush and providing a seal between the latter and the edges of the aperture for the passage of the device in the outer wall of the chamber, and means for tightly applying against the second surface of the electrode the assembly consisting of the set of two coaxial metal tubes, the tubular jacket, and the element providing electrical contact with the second surface of the electrode.

3. A device according to claim 1, characterised in that the space between the walls of the double-walled chamber is filled with a heat insulator.

4. A device according to claim 1, characterised in that the outer wall is hollow and a heat vehicle fluid flows therein.

5. A device according to claim 2, characterised in that the space between the bush and the tubular jacket is filled with asbestos.

6. A device according to claim 2, characterised in that the means whereby the assembly consisting of the set of two coaxial metal tubes, the tubular jacket and the element providing electrical contact with the second surface of the electrode, is applied tightly against the second surface of the electrode, comprises a flange which surrounds the said outer tube, and a spring having one end secured to the outer wall of the chamber and its other end secured to an element which bears on the said flange and is insulated therefrom by a ring of insulating material.

7. A device according to claim 2, characterised in that the means whereby the assembly consisting of the set of two coaxial metal tubes, the tubular jacket and the element providing electrical contact with the second surface of the electrode, is applied tightly to the second surface of the electrode, comprises a casing which is screwed onto an element rigidly secured to the outer wall of the chamber, and a spring housed in said casing and compressed between the top wall of the casing and a collar rigidly secured to the electrical insulating bush.

References Cited

UNITED STATES PATENTS

| 3,271,597 | 9/1966 | Way | 310—11 |
| 3,275,860 | 9/1966 | Way | 310—11 |

FOREIGN PATENTS 60,561 4/1954 France.
(First addition to 1,013,914)

RICHARD E. MOORE, *Primary Examiner.*